Nov. 7, 1939.  C. H. VREELAND  2,179,459
APPARATUS FOR TREATING FRUIT AND THE LIKE
Filed July 17, 1937  2 Sheets-Sheet 1
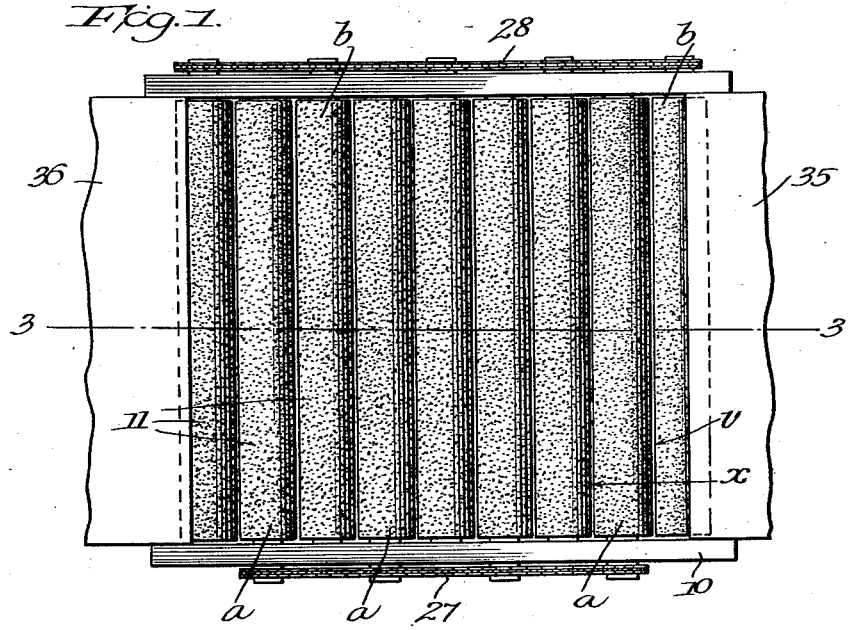
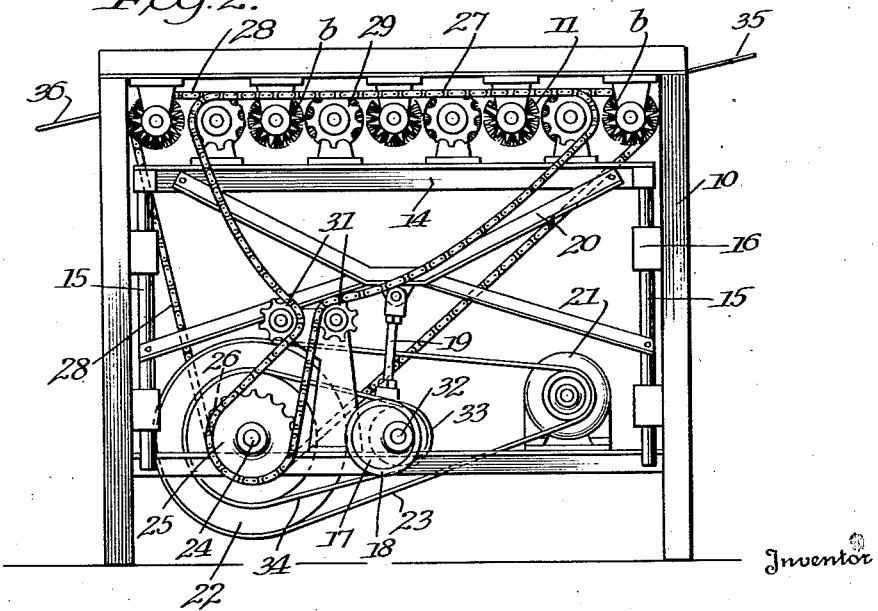
Inventor
Charles H. Vreeland,

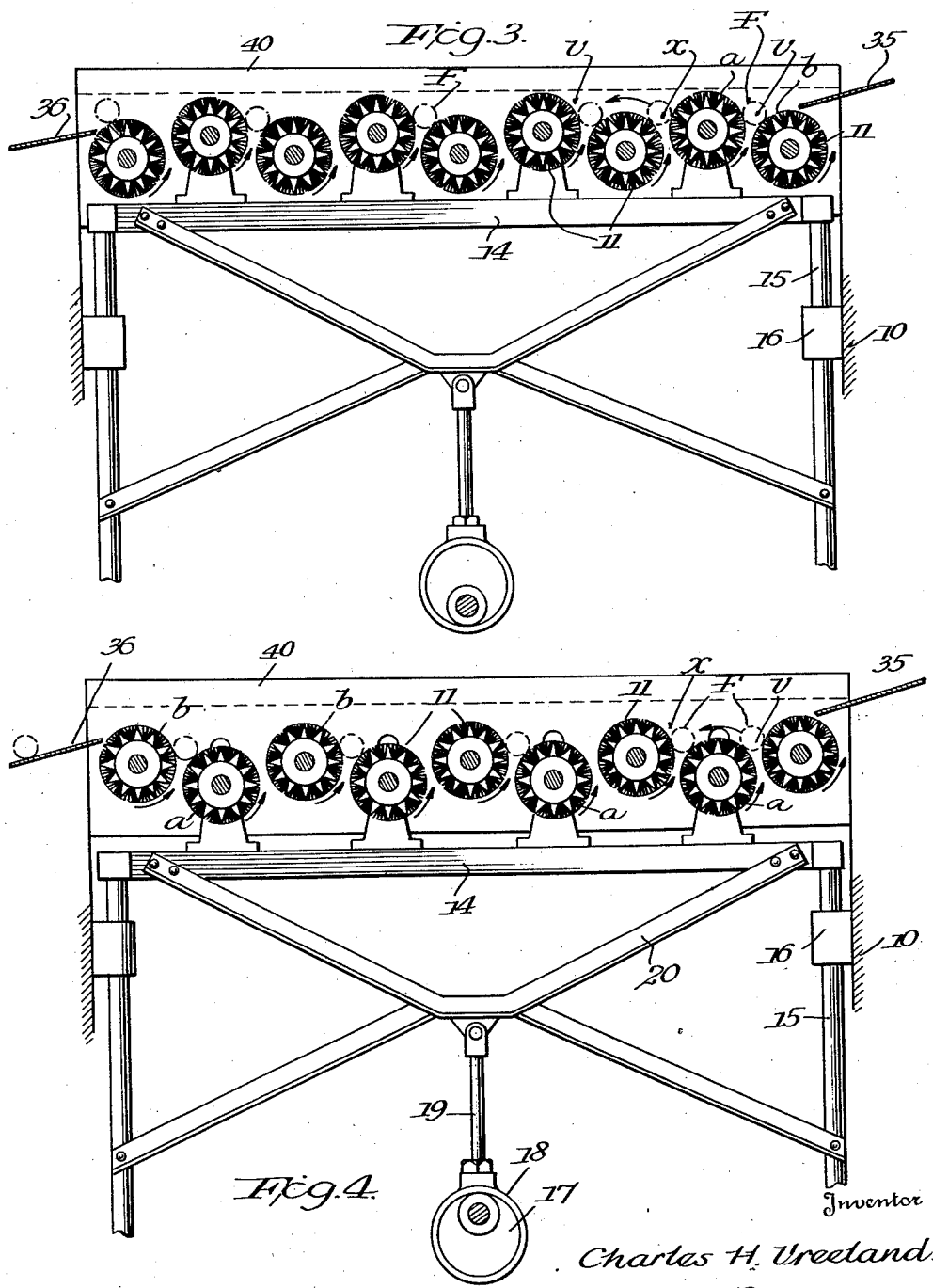

Patented Nov. 7, 1939

2,179,459

UNITED STATES PATENT OFFICE 2,179,459

APPARATUS FOR TREATING FRUIT AND THE LIKE

Charles H. Vreeland, Orlando, Fla., assignor, by mesne assignments, to Ken-Jon Inc., Orlando, Fla., a corporation of Florida Application July 17, 1937, Serial No. 154,301

7 Claims. (Cl. 146—202)

The present invention is a method and apparatus for treating rollable articles and is more particularly applicable to the processing of globular fresh fruit for the market, such apparatus being used generally in fruit washing treatments as well as in fruit polishing and drying treatments.

In a fruit treating machine of the so-called "transverse brush type", in which a number of rotating cylindrical elements, such as brushes or rollers, are arranged on a common plane in parallel relationship to form a solid supporting carrier for the articles to be treated, it is well known that the fruit has a tendency to spin or turn with the surface of the rotating elements, resulting in practically no brushing or other action on the article. At the speeds the brushes are turned (namely 100 to 400 R. P. M.), the fruit is caused to spin on a definite center of gravity so that only a limited area or band around the periphery of the fruit opposite to the axis is actually contacted by the rotating elements.

Furthermore, in methods usually practiced and in machines of the above type of the conventional design, it is customary to cause the fruit to flow into troughs between adjacent brushes or rollers in order to displace fruit previously lodged therein. This displaced fruit passes to the next succeeding trough supplanting fruit in that trough etc. The result is that the passage of the fruit through the machine is dependent upon the volume of incoming fruit and, while partially satisfactory for some of the hardier type of fruit, causes damage to the tender skinned fruit such as thin skinned oranges and other thin skinned citrus fruit, apples or peaches, due to the bumping together of pieces of fruit; and, even with hardier or thicker skinned fruit and other articles, such machines and methods are objectionable because a nicety of delivery is required of incoming fruit and of its advancement over successive rotating elements to insure proper time of treatment to each article, as well as "clean-out" devices to remove all articles of a lot or batch from the treatment before starting another.

With such machines and method, as just referred to, there is also a tendency for the fruit to channel, so that the movement or flow of fruit through the machine is not equal, particularly if the fruit is of varying commercial sizes, causing a varying degree of processing on different pieces of fruit, depending largely on the position of the fruit in the machine, the fruit in the center of the machine passing more quickly through the machine, while that laying along the sides may stay in the machine for a much greater length of time.

It has been found possible to overcome the above objections to such types of machines and methods by varying the gravity component of the article being treated and lying in the valleys or troughs between brushes or rollers so that the gravity component will shift from one adjacent brush or roller to another in various degrees until the pressure of the article, due to the shifting of the gravity component, is sufficient on one brush or roller to carry or advance the article thereover and (as the case may be) to the next succeeding valley or trough without the application or aid of any extraneous force, either tangential or otherwise, such as the urge produced by the introduction of new articles to be treated which contact with the articles being treated or moving flights over the articles.

It has been found, further, that as one means for carrying out the present method of shifting the gravity component of the article being treated, one or more brushes or rollers of a group may be moved in such a manner, for instance, upwardly and downwardly, thereby varying the pressure of the article being treated against the adjacent brushes or rollers. These relatively moving and rotating treating elements also tend to keep the fruit from spinning on one axis, and insure that the entire surface of the article will be subjected to the action of said elements, thereby securing better washing, cleansing, drying or polishing of the article.

More specifically, alternate brushes or rollers of the machine of the present invention may be caused to rise and fall in a rectilinear path to obtain repeated turning or spinning on different axes and to cause the fruit to move through the length of the machine independently of the urge caused by the flow of incoming fruit.

With the above and other objects in view the invention resides in the sundry steps of the method defined and in the details of construction, combination and arrangement of parts of the apparatus, both of which are hereinafter more fully described and particularly pointed out in the appended claims.

In the drawings which illustrate, by way of example, one embodiment of an apparatus for carrying out the invention:

Figure 1 is a plan view of the brushing machine;

Figure 2 is a side elevation of the machine shown in Figure 1;

Figure 3 is a sectional view taken substantially on line 3—3 of Figure 1 and showing the movable brushes in raised position and acting on fruit; and Figure 4 is a view similar to Figure 3 but showing the movable brushes in lowered position and acting on fruit.

Referring more specifically to the drawings, in which like characters denote similar and like parts throughout the several views, the machine may comprise a supporting frame 10 of any suitable construction or design having mounted thereon, preferably in a substantially horizontal plane, a plurality of rotatable elements 11 arranged in substantially close parallel relation in order to provide a support or surface over which the fruit being treated may pass. The elements 11 may be, and preferably are, but not necessarily, of the cylindrical type and each suitably journaled, as at 12, whereby they may be rotated by any convenient or appropriate means, it being preferred, though not necessary, that the elements be of the same size and rotate at the same speed. The elements 11 may be brushes, as shown, which are employed in washing, cleansing, applicating or polishing, or they may be rollers used for many other purposes, one of which is drying in a manner well known in the art. Consequently, when either "brushes" or "rollers" are herein referred to, for convenience, they are intended to mean either brushes or rollers.

Broadly, in accordance with this invention, two or more adjacent brushes 11, have a relative movement, whereby the surfaces thereof, over which the fruit passes, are alternately above and below each other. This function or operation may be accomplished in different ways; one example being shown in the drawings, where one or more of the brushes 11, are movable out of the plane of the axes of the other adjacent brushes, these movable brushes being designated $a$ and the other brushes being designated $b$.

In the present construction, as shown in the drawings, the movable brushes $a$ are reciprocated in a rectilinear path and in a substantially vertical direction transversely of their axes and to a plane through the axes of the other brushes $b$, which preferably remain stationary, although rotatable. It has been demonstrated that very satisfactory results are obtained by reciprocating alternate brushes of the machine, there being, of course, as many brushes or rollers $a$ and $b$ as may be necessary or desired to properly perform the operation, such as washing, cleansing, drying or polishing, and these brushes are substantially equi-spaced as shown in their normal horizontally aligned position as shown in Fig. 2.

The movable brushes $a$ may be mounted in any advantageous manner to accomplish the above results, but are here shown as being mounted on a vertically movable support 14 having guide rods 15 slidably extending therefrom into guide-ways 16 on the frame 10. The movable frame 14 may be reciprocated by cams 17 about each of which is a cam strap or ring 18 connected with a pitman rod 19, the upper ends of the pitman rods being connected to brace bars 20 secured to the movable support 14. The throw or extent of movement or reciprocation of the brushes $a$ will depend on the size of the cams 17.

The movable brushes $a$ and the stationary brushes $b$ as well as the cams 17, may all be driven in any desired manner, and as an example may be driven from the same source of power, such as a motor 21, through a suitable reduction mechanism which may be in the form of a step-pulley 22 having connection with the motor through a belt 23. The pulley 22 is fast on a shaft 24 journalled on the frame 10, the shaft 24 having sprocket wheels 25 and 26 on the ends thereof, respectively, and over which pass sprocket chains 27 and 28, respectively. The chain 27 is also trained over suitable sprocket wheels 29 on the ends of the movable brushes $a$, while the chain 28 is trained over sprocket wheels 30 on the end of the stationary brushes $b$, a suitable slack take-up or other device 31 being provided to keep the chain 27 in engagement with its sprocket wheels when the brushes $a$ are in their lowered positions. The cams 17 are fast on each end of shaft 32 which also has a pulley 33 fast thereon, and over which a belt 34 passes from the pulley 22, thereby driving the cams 17. The shafts 24 and 32 are suitably mounted in bearings, not shown, on the frame 10 of the machine.

Side walls 40 may be provided at the ends of the brushes to retain the fruit in the machine while passing over the brushes and to prevent lateral displacement of the fruit during the operation of the machine. These side walls are not shown in Figure 2 so that the disposition of brushes may be seen.

From the above description of the embodiment of the machine as shown, it will be observed that all of the brushes rotate at the same time in the same direction. The speed and direction of rotation of the brushes, however, may be determined by the type of machine being used or the character of the fruit being treated. In other words, it is within the purview of the invention to change the direction of rotation of certain of the brushes or to only rotate certain of the brushes when found desirable.

In tracing a cycle of operation of the machine with the brushes rotating in the same direction as indicated, fruit (which may be of varying commercial sizes) is fed thereinto in any suitable manner, such as to pass over a conveyor or chute 35 onto the upper surface of the brushes and to discharge from the machine onto a conveyor or chute 36, while the brushes are rotating and while the movable brushes $a$ are in their uppermost position, as shown in Figure 3, it being more practical to provide a stationary brush $b$ at the discharge and receiving ends of the conveyors 35 and 36, respectively.

The fruit thus introduced into the machine will lodge in the first valley from the conveyor 35, indicated by $v$, and there remain, due to the fact that the pressure of the fruit, because of its gravity component, is greater on the stationary brush $b$ than on the movable brush $a$. As the cam 17 moves the brushes $a$ downwardly, to a center position or where the axes thereof align with the axes of the brushes $b$, the pressure of the fruit against the brushes $a$ and $b$ is equalized and this movement of the brushes tends to cause the fruit to change its axis of rotation many times as the gravity component is constantly shifting. As the brushes $a$ are moved further downwardly to their lowermost position (see Figure 4), the gravity component of the fruit against the brushes $a$ increases, finally reaching such a point where its equilibrium is completely overcome with the pressure of the fruit on the movable brush $a$ being much greater than on the stationary brush $b$, with which it may have only a slight frictional contact, thus constantly changing the axis of rotation of the fruit. When the pressure of the fruit or article is sufficient on the brush a, due to the position of the latter, the fruit passes over movable brush a into the trough or valley x between the said brush a and the next succeeding stationary brush b, whereby the fruit F is substantially in the same position on the brushes as it was when it engaged the first two brushes a and b. The cycle is completed at this point and starts again upon the upward movement of the brushes a, thereupon the gravity component of the fruit is brought to equilibrium on brushes a and b. Further upward movement of the brushes a shifts the gravity component of the fruit to increase the pressure thereof on the brushes b sufficiently (while at the same time causing the axis of rotation of the fruit to change) where the fruit in the troughs x advances to a succeeding trough v, when the movable brushes a are moved to assume its uppermost position, as shown in Figure 3, and so on through the machine.

Of course, the relative reciprocating movement of the brushes II is only sufficient to attain the objects and functions of the machine, as above defined, and may be such as to alternately move the upper peripheral fruit supporting surface above and below adjacent brushes so as not to allow the fruit or other articles being supported and treated by the brushes to fall therebetween, before the treatment has been completed. As will be observed from Figures 3 and 4 of the drawings, the relative movement of the brushes being in a rectilinear path with adjacent brushes moved alternately one above the other, the spacing between the several brushes of the bed is maintained equal with respect to all adjacent brushes during this relative movement and this spacing increases only slightly when the brushes are in their extreme upper and lower positions from the spacing of the brushes when in an aligned horizontal position as shown in Fig. 2.

It will be noted that the action of the movable brushes accomplishes a two-fold purpose, namely, (1) that of producing considerable agitation of the fruit, which overcomes its tendency to spin on a definite axis, due to the varying pressure of the fruit against adjacent brushes throughout the cycle, resulting in the fruit changing its axis of rotation many times throughout each cycle so that the entire area of the fruit may be subjected to a varied brushing action, and (2) that the fruit is caused to travel through the machine by the action of the movable brushes independently of the urge of incoming fruit, the travel of the fruit through the machine being variable by simply increasing the speed of the cycle.

Having thus described the invention in detail and the manner in which the same is to be performed, it is understood that the invention is not to be limited to the exact details of the description and disclosure in the drawings herewith, because the same may be modified and varied in numerous ways within the scope of the present invention, and it is desired that the invention is not to be limited beyond the scope of the appended claims.

That which is claimed is:

1. In a brushing machine, a plurality of substantially cylindrical rotatable brushes arranged in close parallel relation to form a bed extending in a general horizontal direction over which articles to be treated may pass through the machine transversely of the brushes, means for rotating the brushes in the same direction for moving the fruit passing over the brushes through the machine, alternate of said brushes being on stationary axes, a vertically reciprocable means supporting the other of the brushes, means for reciprocating said supporting means to move the brushes thereon in unison and alternately above or below the plane of the stationary brushes at different times, during the treatment of said articles, and to an extent to bring the upper surfaces of the movable brushes out of alignment with the upper surfaces of the stationary brushes but to an insufficient extent to break the continuity of the supporting surface of the bed for the articles being treated.

2. In a brushing machine, a plurality of substantially cylindrical rotatable brushes arranged in close parallel relation to form a bed extending in a general horizontal direction over which articles to be treated may pass through the machine transversely of the brushes, means for rotating the brushes in the same direction for moving the fruit passing over the brushes through the machine, alternate of said brushes being on stationary axes, and means for reciprocating the other of said brushes substantially at right angles to the plane of the stationary brushes sufficiently to alternately raise or lower the reciprocable brushes above and below the upper surface of the stationary brushes whereby the articles are advanced from brush to brush through the machine in the direction of the rotation of the brushes, said movement being insufficient to break the continuity of the supporting bed for the articles being treated.

3. A fruit treating machine comprising a bed of rotary brushes of which alternate brushes turn on fixed axes, vertically reciprocable posts on which the intervening brushes are mounted for bodily movement laterally of their axes from points below to points above the plane of the remaining brushes, tie bars connecting said posts, eccentrics engaging said tie bars, means for rotating all of said brushes, and means for rotating said eccentrics.

4. A fruit treating machine comprising a bed of rotary brushes of which alternate brushes turn on fixed axes and intervening brushes on vertically movable axes, means for rotating said brushes, mounting means for the intervening brushes to permit bodily movement of the same laterally of their axes comprising vertically reciprocal posts, tie bars connecting said posts, means for imparting bodily movement to the intervening brushes so that they move progressively from points below the remaining brushes to points above the latter, comprising eccentrics engaging said tie bars and means for rotating said eccentrics.

5. A fruit treating machine comprising a bed of rotary brushes of which alternate brushes turn on fixed axes, vertically reciprocal posts on which the intervening brushes are mounted for bodily movement laterally of their axes from points below to points above the plane of the remaining brushes, tie bars connecting said posts, eccentrics engaging said tie bars, means for rotating said eccentrics and means for rotating all of the brushes comprising a sprocket carried by each of the intervening brushes, a chain trained over all of said sprockets, a sprocket carried by each of the remaining brushes, a chain trained over all of said latter sprockets, and a common drive shaft for said chains.

6. A fruit treating machine comprising a frame having side members, a plurality of brushes rotatably mounted on fixed supports attached to said side members, the axes of said brushes being parallel and in substantially the same plane, a plurality of brushes interposed between the first brushes, said interposed brushes being mounted upon vertically movable supports attached to opposite sides of the frame with their axes in substantially the same plane, the circumferences of successive brushes being spaced apart a distance less than the diameter of the fruit being treated, means for rotating all of the brushes in the same direction, comprising sprockets attached to each of the brushes, chains trained over the sprockets, and means to drive said chains, and means for reciprocating said movable supports a sufficient extent to move the fruit from one brush to another transversely of their axes, whereby alternate intervening brushes are bodily reciprocated from points below to points above the plane of the remaining brushes.

7. In a brushing machine adapted for treating fruit having variable size ranges, three or more equi-spaced and substantially cylindrical rotatable brushes arranged in close parallel relation to form the major portion of a bed extending in a general horizontal direction over which the fruit to be treated may pass through the machine transversely of the brushes, means for rotating the brushes in the same direction for moving the fruit passing over the brushes through the machine, means mounting said brushes of said bed for substantially vertical relative movement of all adjacent brushes in a rectilinear path, means for producing said relative movement of said brushes continuously to dispose adjacent brushes alternately above or below one another with all the spaces between the brushes of said bed maintained equal during said rectilinear movement and the treatment of said fruit, said spacing being always insufficient to break the continuity of the supporting surface of said bed for fruit of varying size range being treated.

CHARLES H. VREELAND.